US012613126B2

(12) United States Patent
Yoda et al.

(10) Patent No.: US 12,613,126 B2
(45) Date of Patent: Apr. 28, 2026

(54) LIGHTING STRIKE DETECTION DEVICE, SYSTEM, AND METHOD USING SENSING INFORMATION FROM AN OPTICAL FIBER NETWORK CONFIGURED FOR COMMUNICATION

(71) Applicant: NEC Corporation, Tokyo (JP)

(72) Inventors: Yukihide Yoda, Tokyo (JP); Koyo Mori, Tokyo (JP); Tadayuki Iwano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 321 days.

(21) Appl. No.: 18/267,844

(22) PCT Filed: Mar. 24, 2021

(86) PCT No.: PCT/JP2021/012141
§ 371 (c)(1),
(2) Date: Jun. 16, 2023

(87) PCT Pub. No.: WO2022/201342
PCT Pub. Date: Sep. 29, 2022

(65) Prior Publication Data
US 2024/0110824 A1 Apr. 4, 2024

(51) Int. Cl.
*G01H 9/00* (2006.01)
(52) U.S. Cl.
CPC .................................. *G01H 9/004* (2013.01)
(58) Field of Classification Search
None
See application file for complete search history.

(56) References Cited

FOREIGN PATENT DOCUMENTS

| CN | 211928072 U | | 11/2020 |
|----|----|----|----|
| JP | 2-66468 | * | 3/1990 |
| JP | H02-066468 A | | 3/1990 |
| JP | H10-177055 A | | 6/1998 |
| KR | 10-2229872 B1 | | 3/2021 |
| WO | 2013/051196 A1 | | 4/2013 |

(Continued)

OTHER PUBLICATIONS

International Search Report for PCT Application No. PCT/JP2021/012141, mailed on Jun. 22, 2021.

(Continued)

*Primary Examiner* — Eric S. McCall
*Assistant Examiner* — Nigel H Plumb
(74) *Attorney, Agent, or Firm* — Sughrue Mion, PLLC

(57) ABSTRACT

A lightning strike detection device includes at least one memory configured to store instructions; and at least one processor configured to execute the instructions to: receive an optical signal including sensing information from an optical fiber network configured for communication, the optical fiber network detecting the sensing information; and detect an occurrence of a lightning strike in the optical fiber network by using the sensing information included in the optical signal. The sensing information indicates at least a vibration pattern of the lightning strike. The at least one processor is configured to execute the instructions to: detect the occurrence of the lightning strike, based on the vibration pattern; detect presence or absence of the occurrence of the lightning strike; and detect an occurrence place of the lightning strike in the optical fiber network.

11 Claims, 9 Drawing Sheets

(56)                References Cited

FOREIGN PATENT DOCUMENTS

WO          2020/044648 A1      3/2020
WO          WO-2020202654 A1 *  10/2020   .............. G01V 1/30

OTHER PUBLICATIONS

JP Office Communication for JP Application No. 2023-508242, dated on Jan. 9, 2025 with English Translation.
JP Office Action for JP Application No. 2023-508242, mailed on Oct. 28, 2025 with English Translation.
Lidong Lu et al., "Location of lightning stroke on OPGW by use of distributed optical fiber sensor", International Symposium on Optoelectronic Technology and Application 2014: Laser and Optical Measurement Technology; and Fiber Optic Sensors, 2014, Proc. of SPIE vol. 9297, 929721, doi: 10.1117/12.2069005.

* cited by examiner

Fig.9

LIGHTING STRIKE DETECTION DEVICE, SYSTEM, AND METHOD USING SENSING INFORMATION FROM AN OPTICAL FIBER NETWORK CONFIGURED FOR COMMUNICATION

This application is a National Stage Entry of PCT/JP2021/012141 filed on Mar. 24, 2021, the contents of all of which are incorporated herein by reference, in their entirety.

TECHNICAL FIELD

The present disclosure relates to a lightning strike detection device and the like.

BACKGROUND ART

PTL 1 discloses a technique for detecting an occurrence position of an accident in an overhead power transmission line. Specifically, in the technique described in PTL 1, an accident detection device and an impact application device are installed on an individual steel tower that supports an optical ground wire (OPGW). Further, a standardization device is installed on both end portions of the OPGW. More specifically, a main standardization device is installed on one end portion of the OPGW, and a secondary standardization device is also installed on another end portion of the OPGW (see a paragraph [0026] to a paragraph [0028], FIG. 1, and the like in PTL 1).

In an individual steel tower, when occurrence of an accident is detected by an associated accident detection device, an associated impact application device applies impact to an OPGW. By the application of the impact, a polarization state of light propagating through an optical fiber of the OPGW fluctuates. The standardization device acquires a position in which the fluctuation in the polarization state occurs, and thus standardizes a steel tower in which occurrence of the accident is detected. In this way, an occurrence position of the accident is standardized (see claim 1, a paragraph [0029], a paragraph to a paragraph [0045], and the like in PTL 1).

Further, PTL 1 also discloses a technique for standardizing an occurrence position of lightning in an overhead power transmission line. In the technique described in PTL 1, a method for standardizing an occurrence position of lightning is similar to a method for standardizing an occurrence position of an accident (see claim 6, a paragraph to a paragraph [0048], FIG. 6, and the like in PTL 1).

CITATION LIST

Patent Literature

PTL 1: Japanese Unexamined Patent Application Publication No. H10-177055

SUMMARY OF INVENTION

Technical Problem

In the technique described in PTL 1, a special device (more specifically, the accident detection device, the impact application device, and the like) is installed on an individual steel tower (see FIG. 1, FIG. 6, and the like in PTL 1). There is a problem that a configuration of a system becomes complicated by including the devices.

The present disclosure has been made in order to solve the problem as described above, and an object of the present disclosure is to provide a lightning strike detection device and the like that are able to detect occurrence of a lightning strike by a simple system configuration that does not need the devices.

Solution to Problem

One aspect of a lightning strike detection device according to the present disclosure includes:

an optical signal reception means for receiving an optical signal including sensing information from an optical fiber network that detects the sensing information; and a lightning strike detection means for detecting occurrence of a lightning strike in the optical fiber network by using the sensing information included in the optical signal, wherein the sensing information indicates at least a vibration pattern of the lightning strike, and the lightning strike detection means detects occurrence of the lightning strike, based on the vibration pattern.

One aspect of a lightning strike detection system according to the present disclosure includes:

an optical signal reception means for receiving an optical signal including sensing information from an optical fiber network that detects the sensing information; and a lightning strike detection means for detecting occurrence of a lightning strike in the optical fiber network by using the sensing information included in the optical signal, wherein the sensing information indicates at least a vibration pattern of the lightning strike, and the lightning strike detection means detects occurrence of the lightning strike, based on the vibration pattern.

One aspect of a lightning strike detection method according to the present disclosure includes:

receiving, by an optical signal reception means, an optical signal including sensing information from an optical fiber network that detects the sensing information; and detecting, by a lightning strike detection means, occurrence of a lightning strike in the optical fiber network by using the sensing information included in the optical signal, wherein the sensing information indicates at least a vibration pattern of the lightning strike, and the lightning strike detection means detects occurrence of the lightning strike, based on the vibration pattern.

Advantageous Effects of Invention

According to the present disclosure, occurrence of a lightning strike can be detected by a simple system configuration.

BRIEF DESCRIPTION OF DRAWINGS

FIG. 9 is an explanatory diagram illustrating an example of an image displayed by the lightning strike detection system according to the first example embodiment.

EXAMPLE EMBODIMENT

Hereinafter, example embodiments of the present disclosure are described in detail with reference to accompanying drawings.

First Example Embodiment

Figure 1:
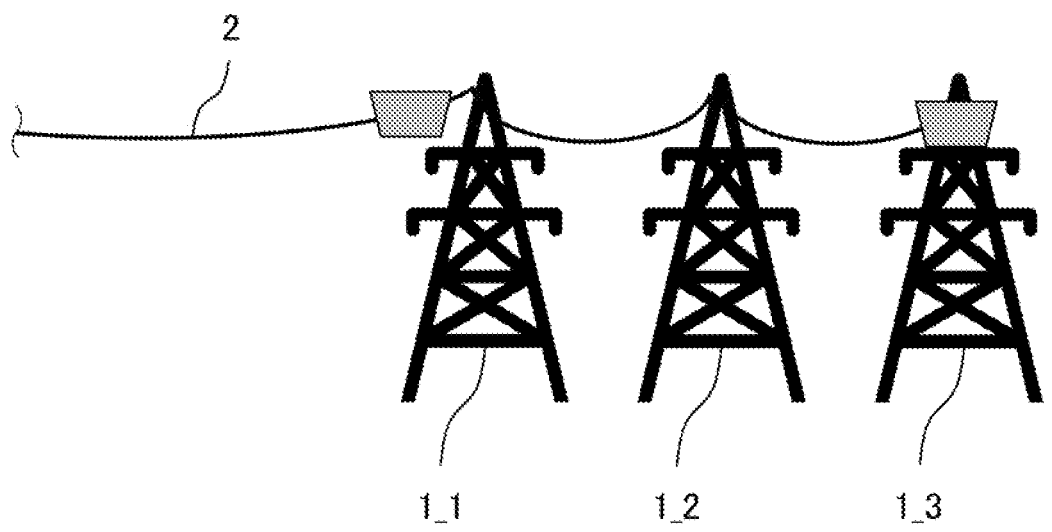
FIG. 1 is an explanatory diagram illustrating an example of a state where an optical fiber cable is provided on a plurality of steel towers in an overhead manner by an overhead method.
Figure 2:
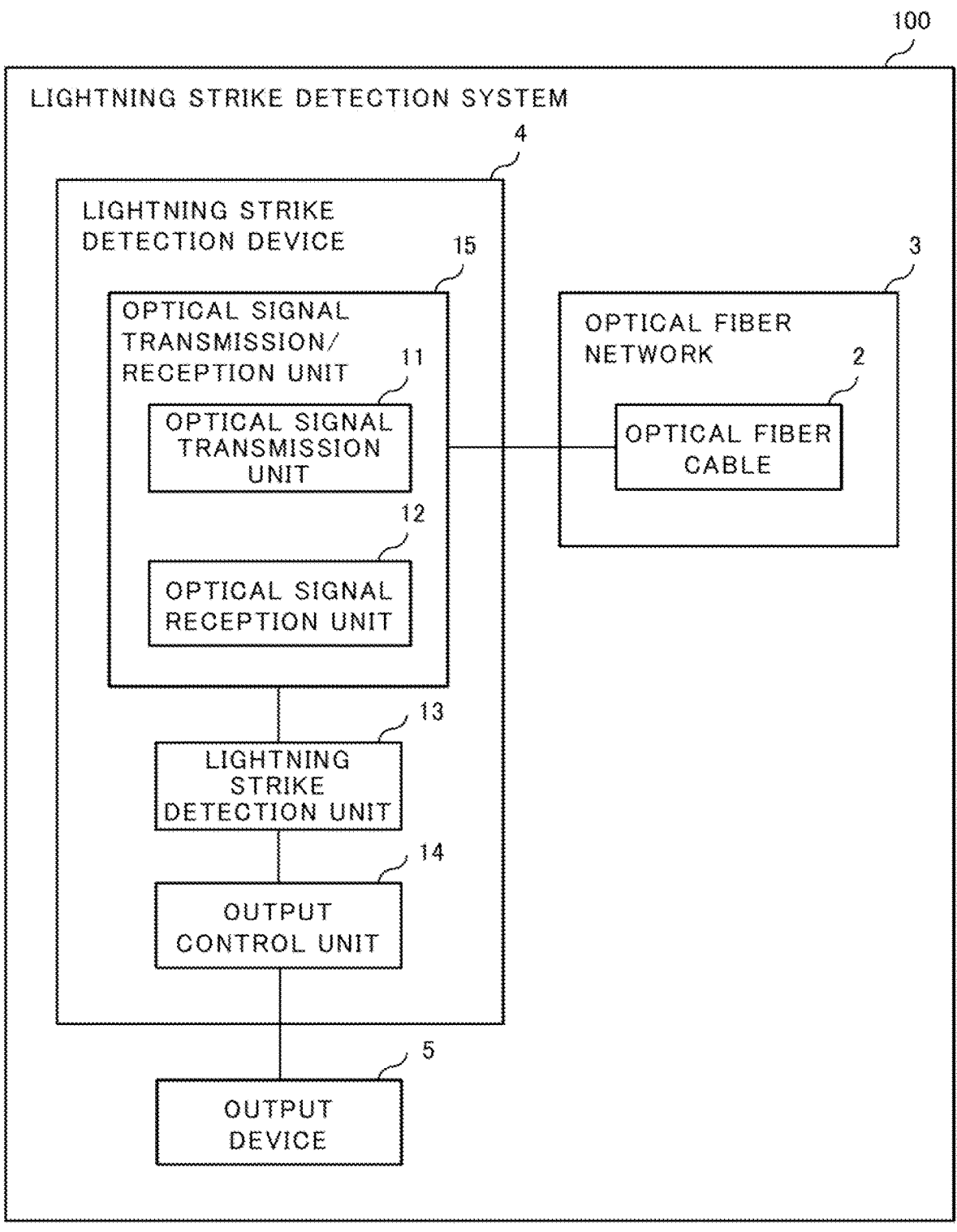
FIG. 2 is a block diagram illustrating a main unit of a lightning strike detection system according to a first example embodiment.

FIG. 1 is an explanatory diagram illustrating an example of a state where an optical fiber cable is provided on a plurality of steel towers in an overhead manner by an overhead method. FIG. 2 is a block diagram illustrating a main unit of a lightning strike detection system according to a first example embodiment. The lightning strike detection system according to the first example embodiment will be described with reference to FIGS. 1 and 2.

As illustrated in FIG. 1, an optical fiber cable 2 is constructed by an overhead method via N steel towers 1_1 to 1_N. Herein, N is an integer equal to or more than 2. In the example illustrated in FIG. 1, N=3. The steel towers 1_1 to 1_N are used for supplying power or distributing power. The optical fiber cable 2 is, for example, a communication optical fiber cable provided inside an overhead ground wire being already constructed. In other words, the optical fiber cable 2 uses, for example, an OPGW being already constructed.

As illustrated in FIG. 2, a main unit of an optical fiber network 3 is formed by the optical fiber cable 2. Herein, the optical fiber network 3 may include another optical fiber cable (not illustrated) in addition to the optical fiber cable 2. In other words, the optical fiber network 3 may include one optical fiber cable 2, or may include a plurality of optical fiber cables. The another optical fiber cable uses an optical fiber cable similar to the optical fiber cable 2. In other words, the another optical fiber cable may be constructed by an overhead method via a plurality of steel towers (not illustrated). Hereinafter, an example in which the optical fiber network 3 includes one optical fiber cable 2 will be mainly described.

An individual optical fiber cable included in the optical fiber network 3 can be used for optical fiber sensing. Specifically, for example, an individual optical fiber cable included in the optical fiber network 3 can be used for detection of a vibration, a sound, or a temperature by distributed fiber optic sensing (DFOS). Hereinafter, information detected by the optical fiber sensing using the optical fiber network 3 may be collectively referred to as "sensing information". In other words, the optical fiber network 3 detects sensing information.

As illustrated in FIG. 2, a lightning strike detection system 100 includes the optical fiber network 3, a lightning strike detection device 4, and an output device 5. The lightning strike detection device 4 includes an optical signal transmission unit 11, an optical signal reception unit 12, a lightning strike detection unit 13, and an output control unit 14. The optical signal transmission unit 11 and the optical signal reception unit 12 constitute a main unit of the optical signal transmission/reception unit 15.

The optical signal transmission unit 11 outputs an optical signal having a pulse shape to the optical fiber cable 2. The output optical signal is input to the optical fiber cable 2, and propagates through the inside of the optical fiber cable 2. At this time, backscattered light is generated inside the optical fiber cable 2. The optical signal reception unit 12 receives an optical signal associated with the generated backscattered light. The received optical signal includes sensing information for the DFOS.

Note that the optical signal transmission/reception unit 15 may include a device (not illustrated) for separating an optical signal being output from the optical signal transmission unit 11 and an optical signal being received by the optical signal reception unit 12. For example, the optical signal transmission/reception unit 15 may include an optical circulator (not illustrated) provided among the optical signal transmission unit 11, the optical fiber cable 2, and the optical signal reception unit 12.

The lightning strike detection unit 13 detects occurrence of a lightning strike in the optical fiber network 3 by using the sensing information included in the optical signal being received by the optical signal reception unit 12. More specifically, the lightning strike detection unit 13 detects presence or absence of occurrence of a lightning strike in the optical fiber network 3, and also detects an occurrence position (hereinafter may be referred to as an "occurrence place") of the lightning strike in the optical fiber network 3. A specific example of a detection method by the lightning strike detection unit 13 will be described below with reference to FIGS. 7A, 7B, 8A, and 8B.

The output control unit 14 performs control for outputting information (hereinafter may be referred to as "detection result information") including a result of detection by the lightning strike detection unit 13. The output device 5 is used for an output of the detection result information. The output device 5 includes, for example, at least one of a display device, a sound output device, and a communication device. The display device uses, for example, a display. The sound output device uses, for example, a speaker. The communication device uses, for example, a special transmitter and a special receiver.

Specifically, for example, the output control unit 14 performs control for displaying an image I associated with the detection result information. The display device of the output device 5 is used for display of the image I. Alternatively, for example, the output control unit 14 performs control for outputting a sound associated with the detection result information. The sound output device of the output device 5 is used for an output of the sound. Alternatively, for example, the output control unit 14 performs control for transmitting a signal associated with the detection result information to another system (not illustrated). The communication device of the output device 5 is used for transmission of the signal. Note that a specific example of the image I displayed by the display device of the output device 5 will be described below with reference to FIG. 9.

In this way, the main unit of the lightning strike detection system 100 is formed.

Hereinafter, the optical signal transmission unit 11 may be referred to as an "optical signal transmission means". Further, the optical signal reception unit 12 may be referred to as an "optical signal reception means". Further, the lightning strike detection unit 13 may be referred to as a "lightning strike detection means". Further, the output control unit 14 may be referred to as an "output control means".

Next, a hardware configuration of a main unit of the lightning strike detection device 4 will be described with reference to FIGS. 3 to 5.

Figure 3:
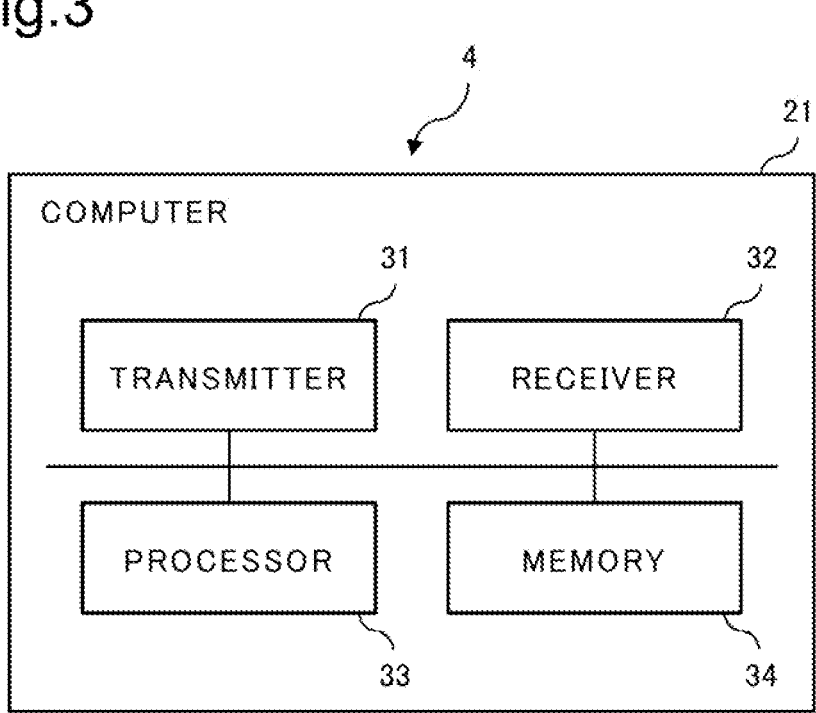
FIG. 3 is a block diagram illustrating a hardware configuration of a main unit of a lightning strike detection device according to the first example embodiment.
Figure 4:
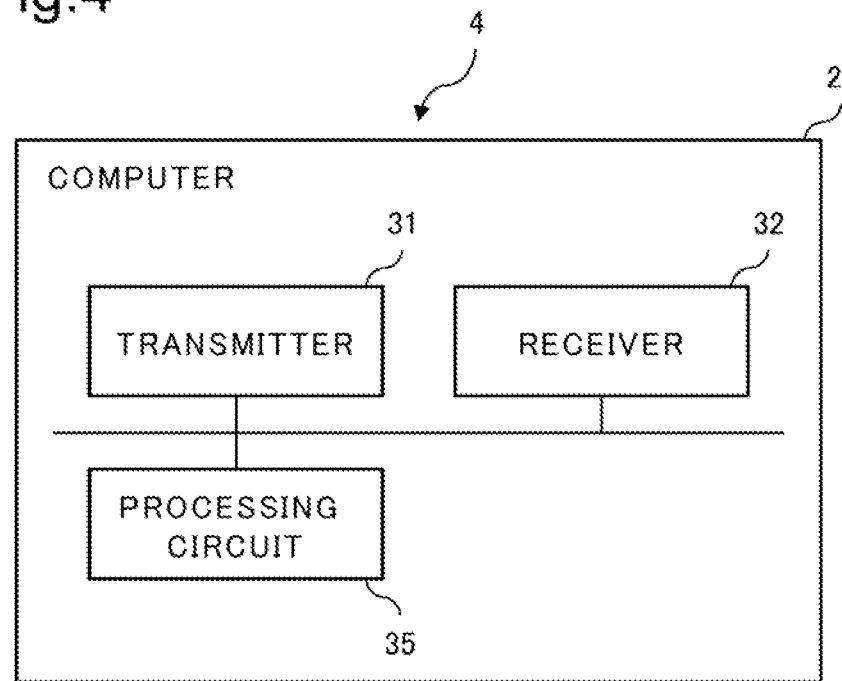
FIG. 4 is a block diagram illustrating another hardware configuration of a main unit of the lightning strike detection device according to the first example embodiment.
Figure 5:
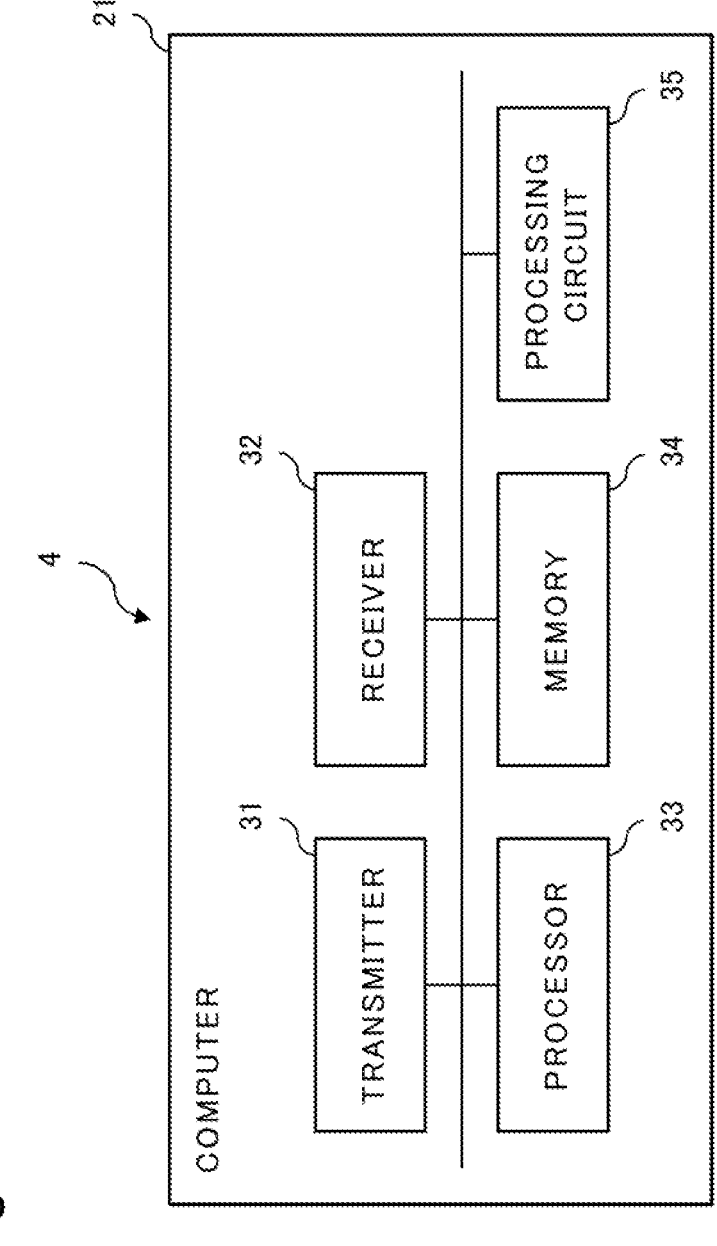
FIG. 5 is a block diagram illustrating another hardware configuration of a main unit of the lightning strike detection device according to the first example embodiment.

As illustrated in each of FIGS. 3 to 5, the lightning strike detection device 4 uses a computer 21.

As illustrated in FIG. 3, the computer 21 includes a transmitter 31, a receiver 32, a processor 33, and a memory 34. The memory 34 stores a program (including a program for causing the transmitter 31 to function as the optical signal transmission unit 11 and a program for causing the receiver 32 to function as the optical signal reception unit 12) for causing the computer 21 to function as the optical signal transmission unit 11, the optical signal reception unit 12, the lightning strike detection unit 13, and the output control unit 14. The processor 33 reads and executes the program stored in the memory 34. In this way, a function F1 of the optical signal transmission unit 11, a function F2 of the optical signal reception unit 12, a function F3 of the lightning strike detection unit 13, and a function F4 of the output control unit 14 are achieved.

Alternatively, as illustrated in FIG. 4, the computer 21 includes the transmitter 31, the receiver 32, and a processing circuit 35. The processing circuit 35 performs processing (including processing of causing the transmitter 31 to function as the optical signal transmission unit 11 and processing of causing the receiver 32 to function as the optical signal reception unit 12) of causing the computer 21 to function as the optical signal transmission unit 11, the optical signal reception unit 12, the lightning strike detection unit 13, and the output control unit 14. In this way, the functions F1 to F4 are achieved.

Alternatively, as illustrated in FIG. 5, the computer 21 includes the transmitter 31, the receiver 32, the processor 33, the memory 34, and the processing circuit 35. In this case, a function of a part of the functions F1 to F4 is achieved by the processor 33 and the memory 34, and a remaining function of the functions F1 to F4 is achieved by the processing circuit 35.

The processor 33 is formed of one or more processors. The individual processor uses, for example, a central processing unit (CPU), a graphics processing unit (GPU), a microprocessor, a microcontroller, or a digital signal processor (DSP).

The memory 34 is formed of one or more memories. The individual memory uses, for example, a random access memory (RAM), a read only memory (ROM), a flash memory, an erasable programmable read only memory (EPROM), an electrically erasable programmable read only memory (EEPROM), a solid state drive, a hard disk drive, a flexible disk, a compact disk, a digital versatile disc (DVD) a Blu-ray disk, a magneto optical (MO) disk, or a mini disk.

The processing circuit 35 is formed of one or more processing circuits. The individual processing circuit uses, for example, an application specific integrated circuit (ASIC), a programmable logic device (PLD), a field programmable gate array (FPGA), a system on a chip (SoC), or a system large scale integration (LSI).

Note that the processor 33 may include a special processor associated with each of the functions F1 to F4. The memory 34 may include a special memory associated with each of the functions F1 to F4. The processing circuit 35 may include a special processing circuit associated with each of the functions F1 to F4.

Figure 6:
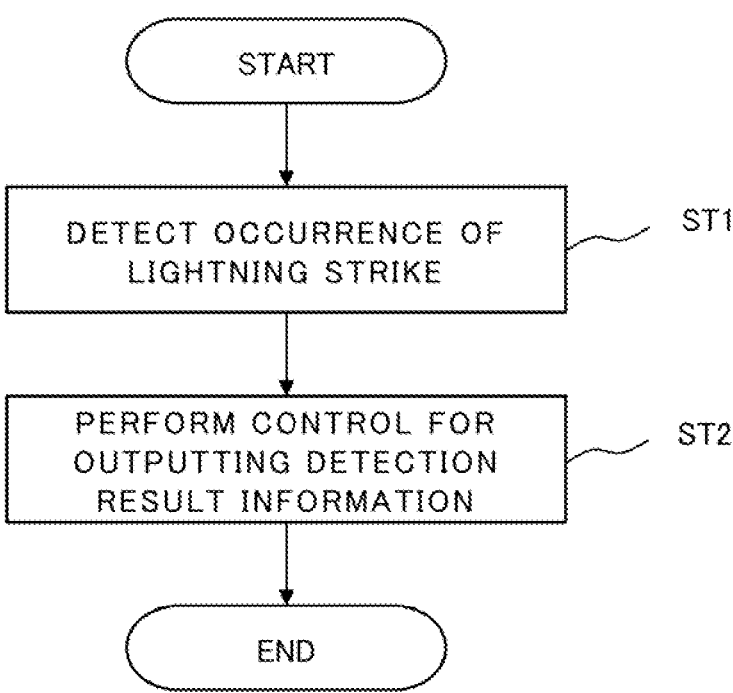
FIG. 6 is a flowchart illustrating an operation of the lightning strike detection device according to the first example embodiment.

Next, an operation of the lightning strike detection device 13 and the output control unit 14 will be mainly described for an operation of the lightning strike detection device 4 with reference to a flowchart illustrated in FIG. 6.

First, the lightning strike detection unit 13 detects a lightning strike in the optical fiber network 3 by using sensing information included in an optical signal being received by the optical signal reception unit 12 (step ST1). More specifically, the lightning strike detection unit 13 detects presence or absence of occurrence of a lightning strike in the optical fiber network 3. Alternatively, the lightning strike detection unit 13 detects presence or absence of occurrence of a lightning strike in the optical fiber network 3, and also detects an occurrence position of the lightning strike in the optical fiber network 3.

Next, the output control unit 14 performs control for outputting information (i.e., detection result information) including a result of detection in step ST1 (step ST2). In this way, the image I associated with the detection result information is displayed, a sound associated with the detection result information is output, or a signal associated with the detection result information is transmitted.

Next, a specific example of a detection method by the lightning strike detection unit 13 will be described with reference to FIGS. 7A, 7B, 8A, and 8B.

As described above, the optical fiber network 3 can be used for detection of a vibration by the DFOS. More specifically, vibration intensity for each frequency component at any point of the optical fiber cable 2 is detected in time series. Sensing information includes data (hereinafter may be referred to as "vibration data") indicating a pattern (hereinafter may be referred to as a "vibration pattern") of an associated vibration. In other words, a vibration pattern is a pattern indicating at least one of a fluctuation in vibration intensity with respect to time and a distribution of vibration intensity with respect to a frequency.

Herein, a lightning strike occurs in the optical fiber cable 2, and thus a characteristic vibration (i.e., a vibration of the lightning strike) is generated in the optical fiber cable 2. At this time, sensing information includes vibration data indicating a vibration pattern of the lightning strike. In other words, a vibration pattern in presence of occurrence of a lightning strike at any point of the optical fiber cable 2 is different from a vibration pattern in absence of occurrence of a lightning strike.

Figure 7A:
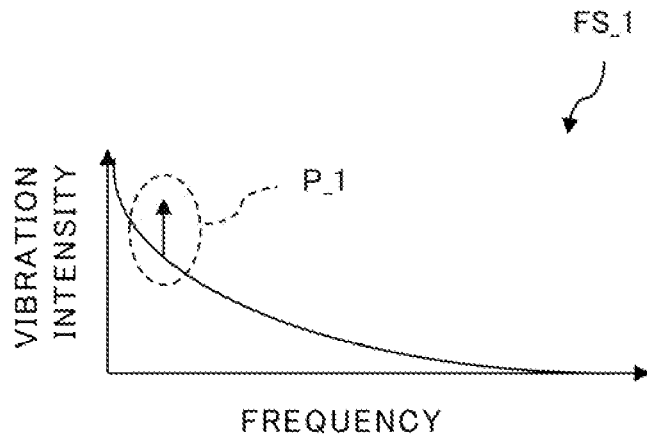
FIG. 7A is an explanatory diagram illustrating an example of a frequency spectrum associated with a vibration pattern in absence of occurrence of a lightning strike.
Figure 7B:
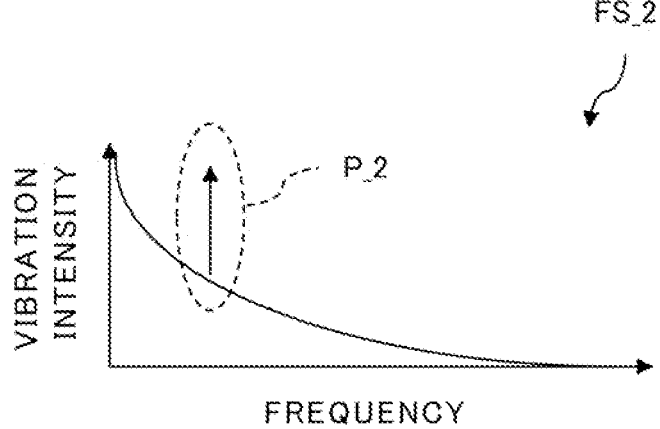
FIG. 7B is an explanatory diagram illustrating an example of a frequency spectrum associated with a vibration pattern in presence of occurrence of a lightning strike.

For example, FIG. 7A illustrates an example of a frequency spectrum FS_1 associated with a vibration pattern in absence of occurrence of a lightning strike at a specific point of the optical fiber cable 2. P_1 in FIG. 7A indicates a peak portion in the frequency spectrum FS 1. On the other hand, FIG. 7B illustrates an example of a frequency spectrum FS_2 associated with a vibration pattern in presence of occurrence of a lightning strike at an associated specific point. P_2 in FIG. 7B indicates a peak portion in the frequency spectrum FS_2.

As illustrated in FIGS. 7A and 7B, normally, a shape of the frequency spectrum FS_2 in presence of occurrence of a lightning strike is different from a shape of the frequency spectrum FS_1 in absence of occurrence of a lightning strike. More specifically, a peak frequency in the frequency spectrum FS_2 in presence of occurrence of a lightning strike has a value different from that of a peak frequency in the frequency spectrum FS_1 in absence of occurrence of a lightning strike. Further, a peak value of the frequency spectrum FS_2 in presence of occurrence of a lightning strike is a value different from a peak value of the frequency spectrum FS_1 in absence of occurrence of a lightning strike.

Figures 8A, 8B:
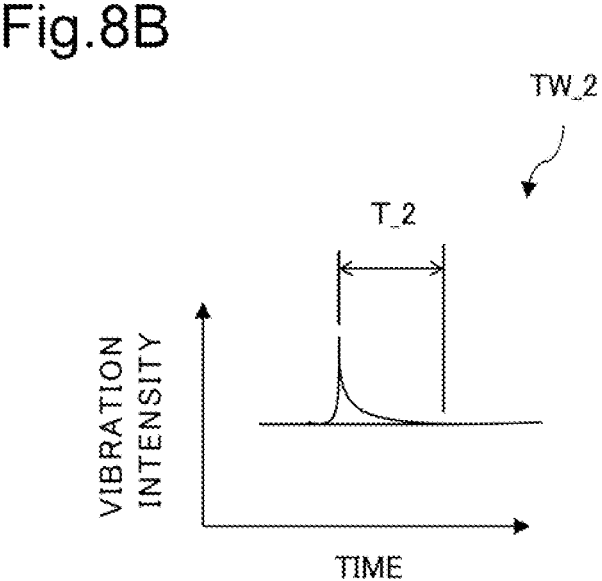
FIG. 8A is an explanatory diagram illustrating an example of a time waveform associated with a vibration pattern in absence of occurrence of a lightning strike.
FIG. 8B is an explanatory diagram illustrating an example of a time waveform associated with a vibration pattern in presence of occurrence of a lightning strike.

Further, for example, FIG. 8A illustrates an example of a time waveform TW_1 associated with a vibration pattern in absence of occurrence of a lightning strike at a specific point of the optical fiber cable 2. T_1 in FIG. 8A indicates an attenuation time when a momentary vibration is generated by a factor (for example, wind) different from lightning. On the other hand, FIG. 8B illustrates an example of a time waveform TW_2 associated with a vibration pattern in presence of occurrence of a lightning strike at an associated specific point. T_2 in FIG. 8B indicates an attenuation time when a momentary vibration is generated by lightning.

As illustrated in FIGS. 8A and 8B, normally, a shape of the time waveform TW_2 in presence of occurrence of a lightning strike is different from a shape of the time waveform TW_1 in absence of occurrence of a lightning strike. More specifically, the attenuation time T_2 in the time waveform TW_2 in presence of occurrence of a lightning strike has a value different from that of the attenuation time T_1 in the time waveform TW_1 in absence of occurrence of a lightning strike.

Thus, a model for identifying a vibration pattern in absence of occurrence of a lightning strike and a vibration pattern in presence of occurrence of a lightning strike is prepared in advance for any point of the optical fiber cable 2, based on the characteristics (a peak value, a peak frequency, or an attenuation time). The model is generated by using machine learning, for example. The lightning strike detection unit 13 inputs, to the model, vibration data included in sensing information associated with each point of the optical fiber cable 2. In contrast, the model outputs information indicating whether a vibration pattern indicated by the input vibration data is a vibration pattern in presence of occurrence of a lightning strike or a vibration pattern in absence of occurrence of a lightning strike. In this way, presence or absence of occurrence of a lightning strike at each point of the optical fiber cable 2 is detected. In other words, presence or absence of occurrence of a lightning strike in the optical fiber cable 2 is detected, and an occurrence position of the lightning strike in the optical fiber cable 2 is also detected.

Alternatively, data indicating a vibration pattern (hereinafter referred to as a "reference pattern") equal to a vibration pattern in presence of occurrence of a lightning strike are prepared in advance for any point of the optical fiber cable 2. The data are generated by generating an artificial vibration that imitates a lightning strike, for example. The lightning strike detection unit 13 compares, with the reference pattern indicated by the data, a vibration pattern indicated by vibration data included in sensing information being associated with each point of the optical fiber cable 2. In other words, the lightning strike detection unit 13 performs so-called "pattern matching". In this way, presence or absence of occurrence of a lightning strike at each point of the optical fiber cable 2 is detected. In other words, presence or absence of occurrence of a lightning strike in the optical fiber cable 2 is detected, and an occurrence position of the lightning strike in the optical fiber cable 2 is also detected.

Next, a specific example of the image I displayed by the display device of the output device 5 will be described with reference to FIG. 9.

When detection result information indicates presence of occurrence of a lightning strike, the image I indicating the presence of the occurrence of the lightning strike may be displayed. In addition, when the detection result information indicates an occurrence position of the lightning strike, the image I may indicate the occurrence position of the lightning strike.

Figure 9:
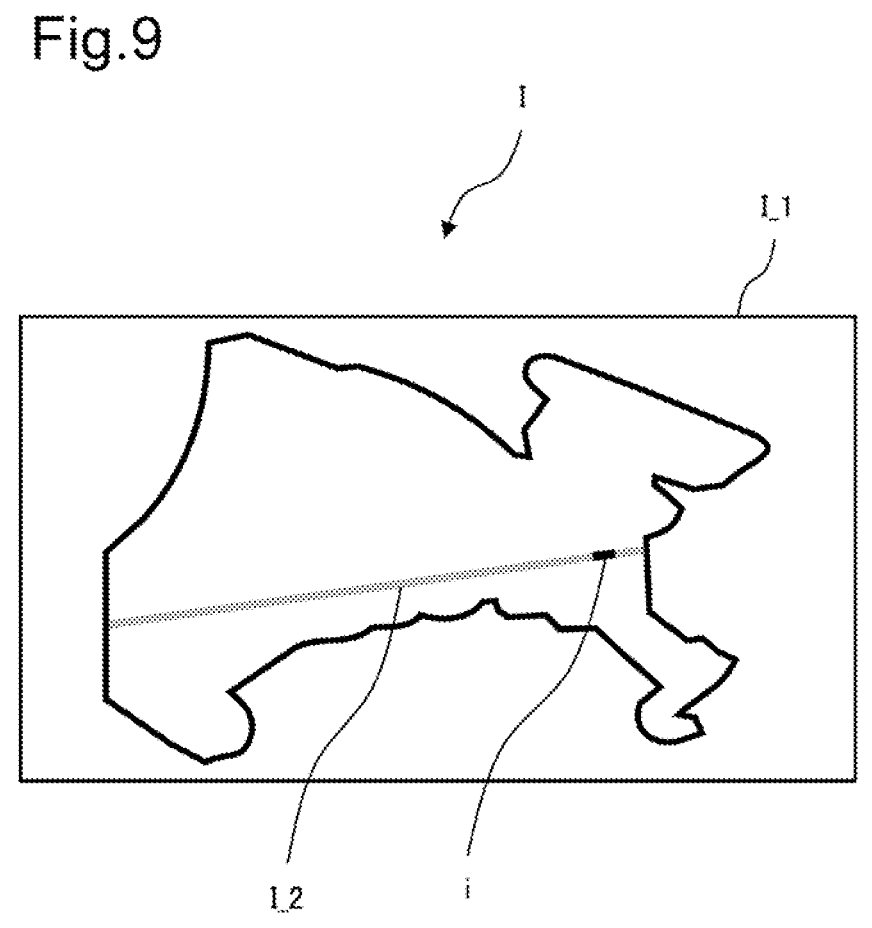

FIG. 9 illustrates an example of the image I.

In the example illustrated in FIG. 9, the image I includes a map image I_1 of a region where the optical fiber cable 2 is constructed. The map image I_1 may be freely zoomed in and out by an input of an operation using an operation input device (for example, a mouse or a touch panel) that is not illustrated. In the map image I_1, a linear image I_2 associated with the optical fiber cable 2 is superimposed and displayed. A color of a portion i of the image I_2 being associated with an occurrence position of a lightning strike is different from a color of another portion of the image I_2. A user of the lightning strike detection system 100 can easily visually recognize the occurrence position of the lightning strike by viewing the image I.

Next, an effect by using the lightning strike detection system 100 will be described.

As described above, by using the lightning strike detection system 100, occurrence of a lightning strike in the optical fiber network 3 can be detected. More specifically, presence or absence of occurrence of an associated lightning strike can be detected, and an occurrence position of the lightning strike can also be detected. At this time, detection by a so-called "remote" manner can be achieved. In other words, when an occurrence position of an associated lightning strike is detected, a patrol by a worker and the like can be made unnecessary.

Further, in the lightning strike detection system 100, occurrence of a lightning strike as described above can be detected by the DFOS using the optical fiber cable 2 being already constructed (for example, an OPGW being already constructed). Thus, when occurrence of an associated lightning strike is detected, a special device installed on the individual steel tower 1 is unnecessary. Therefore, as compared to a case where the device (for example, the accident detection device and the impact application device in the technique described in PTL 1) is used, occurrence of a lightning strike can be detected by a simple system configuration.

Further, in the lightning strike detection system 100, when occurrence of a lightning strike is detected based on a vibration pattern (i.e., occurrence of a lightning strike is detected by the DFOS), backscattered light with respect to an optical signal input to the optical fiber cable 2 is used. Thus, occurrence of the lightning strike can be detected by using a device (i.e., the lightning strike detection device 4) provided on one end portion of the optical fiber cable 2. In other words, when occurrence of the lightning strike is detected, a special device installed on the other end portion of the optical fiber cable 2 can be made unnecessary. As a result, as compared to a case where a device (for example, the main standardization device and the secondary standardization device in the technique described in PTL 1) installed on both end portions of an OPGW is used, occurrence of a lightning strike can be detected by a simple system configuration.

Next, a modification example of the lightning strike detection system 100 will be described.

As described above, the optical fiber network 3 may include a plurality of optical fiber cables. In this case, a plurality of the optical signal transmission/reception units 15 associated with the plurality of optical fiber cables may be provided. In other words, the individual optical signal transmission/reception unit 15 is provided on one end portion of the associated optical fiber cable. The lightning strike detection unit 13 may detect occurrence of a lightning strike in the individual optical fiber cable by using sensing information included in an optical signal being received by the optical signal reception unit 12 of the individual optical signal transmission/reception unit 15.

Next, another modification example of the lightning strike detection system 100 will be described.

A structure that supports an individual optical fiber cable included in the optical fiber network 3 is not limited to a plurality of steel towers. For example, the optical fiber network 3 may include an optical fiber cable constructed by an overhead method via a plurality of utility poles (not illustrated).

Next, a modification example of the lightning strike detection device 4 will be described with reference to FIG. 10. Further, another modification example of the lightning strike detection system 100 will be described with reference to FIG. 11.

Figure 10:
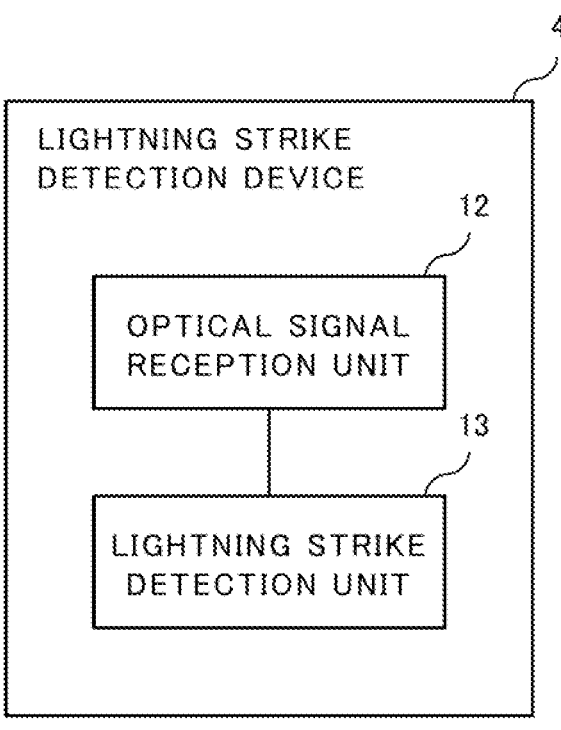
FIG. 10 is a block diagram illustrating a main unit of another lightning strike detection device according to the first example embodiment.

As illustrated in FIG. 10, the optical signal reception unit 12 and the lightning strike detection unit 13 may constitute a main unit of the lightning strike detection device 4. In this case, the optical signal transmission unit 11 and the output control unit 14 may be provided outside the lightning strike detection device 4. Further, in this case, when the optical fiber cable 2 is used for communication, the optical signal transmission unit 11 may be provided in an optical communication device (not illustrated) using the optical fiber cable 2.

Figure 11:
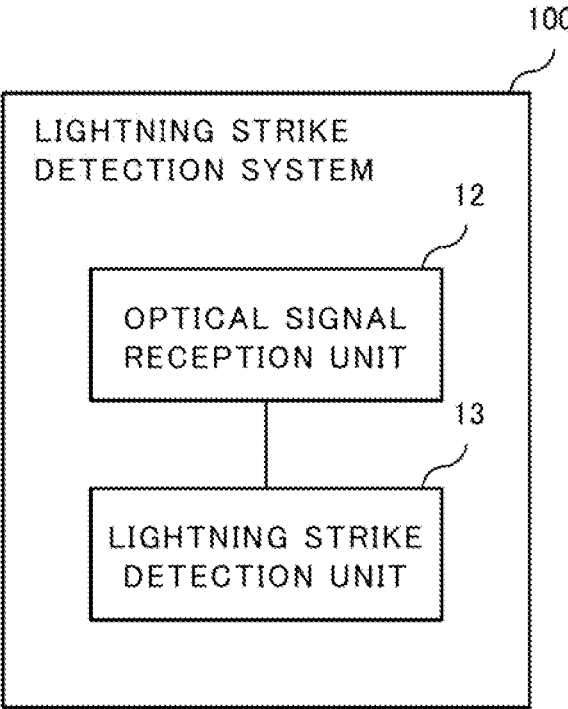
FIG. 11 is a block diagram illustrating a main unit of another lightning strike detection system according to the first example embodiment.

As illustrated in FIG. 11, the optical signal reception unit 12 and the lightning strike detection unit 13 may constitute a main unit of the lightning strike detection system 100. In this case, the optical fiber cable 2 may be provided outside the lightning strike detection device 100. Further, the optical signal transmission unit 11 and the output control unit 14 may be provided outside the lightning strike detection system 100. Further, the output device 5 may be provided outside the lightning strike detection system 100. Further, in this case, when the optical fiber cable 2 is used for communication, the optical signal transmission unit 11 may be provided in an optical communication device (not illustrated) using the optical fiber cable 2.

Even in these cases, the effect as described above can be achieved. In other words, the optical signal reception unit 12 receives an optical signal including sensing information from the optical fiber network 3 that detects the sensing information. The lightning strike detection unit 13 detects occurrence of a lightning strike in the optical fiber network 3 by using the sensing information included in the optical signal. Herein, the sensing information indicates at least a vibration pattern of the lightning strike. The lightning strike detection unit 13 detects occurrence of the lightning strike, based on the vibration pattern. In this way, occurrence of the lightning strike in the optical fiber network 3 can be detected. Particularly, occurrence of the lightning strike can be detected by a simple system configuration that does not need a special device installed on an individual steel tower and the like.

Note that the lightning strike detection system 100 may include at least one of the optical signal transmission unit 11 and the output control unit 14 in addition to the optical signal reception unit 12 and the lightning strike detection unit 13 (not illustrated). Each unit of the lightning strike detection system 100 may be formed of an individual device. The device may be distributed geographically or in terms of a network. For example, the device may include an edge computer and a cloud computer.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

A part or the whole of the example embodiments described above can be described as, but not limited to, the following supplementary notes.

[Supplementary Note]

[Supplementary Note 1]

A lightning strike detection device including:

an optical signal reception means for receiving an optical signal including sensing information from an optical fiber network that detects the sensing information; and a lightning strike detection means for detecting occurrence of a lightning strike in the optical fiber network by using the sensing information included in the optical signal, wherein the sensing information indicates at least a vibration pattern of the lightning strike, and the lightning strike detection means detects occurrence of the lightning strike, based on the vibration pattern.

[Supplementary Note 2]

The lightning strike detection device according to supplementary note 1, wherein the lightning strike detection means detects presence or absence of occurrence of the lightning strike, and also detects an occurrence place of the lightning strike in the optical fiber network.

[Supplementary Note 3]

The lightning strike detection device according to supplementary note 1 or 2, wherein the lightning strike detection means detects occurrence of the lightning strike by comparing the vibration pattern with a predetermined reference pattern.

[Supplementary Note 4]

The lightning strike detection device according to any one of supplementary notes 1 to 3, wherein information including a result of detection by the lightning strike detection means is output.

[Supplementary Note 5]

A lightning strike detection system including:

an optical signal reception means for receiving an optical signal including sensing information from an optical fiber network that detects the sensing information; and a lightning strike detection means for detecting occurrence of a lightning strike in the optical fiber network by using the sensing information included in the optical signal, wherein the sensing information indicates at least a vibration pattern of the lightning strike, and the lightning strike detection means detects occurrence of the lightning strike, based on the vibration pattern.

[Supplementary Note 6]

The lightning strike detection system according to supplementary note 5, wherein the lightning strike detection means detects presence or absence of occurrence of the lightning strike, and also detects an occurrence place of the lightning strike in the optical fiber network.

[Supplementary Note 7]

The lightning strike detection system according to supplementary note 5 or 6, wherein the lightning strike detection means detects occurrence of the lightning strike by comparing the vibration pattern with a predetermined reference pattern.

[Supplementary Note 8]

The lightning strike detection system according to any one of supplementary notes 5 to 7, wherein information including a result of detection by the lightning strike detection means is output.

[Supplementary Note 9]

A lightning strike detection method including:

receiving, by an optical signal reception means, an optical signal including sensing information from an optical fiber network that detects the sensing information; and detecting, by a lightning strike detection means, occurrence of a lightning strike in the optical fiber network by using the sensing information included in the optical signal, wherein the sensing information indicates at least a vibration pattern of the lightning strike, and the lightning strike detection means detects occurrence of the lightning strike, based on the vibration pattern.

[Supplementary Note 10]

The lightning strike detection method according to supplementary note 9, further including, by the lightning strike detection means, detecting presence or absence of occurrence of the lightning strike, and also detecting an occurrence place of the lightning strike in the optical fiber network.

[Supplementary Note 11]

The lightning strike detection method according to supplementary note 9 or 10, further including, by the lightning strike detection means, detecting occurrence of the lightning strike by comparing the vibration pattern with a predetermined reference pattern.

[Supplementary Note 12]

The lightning strike detection method according to any one of supplementary notes 9 to 11, further including outputting information including a result of detection by the lightning strike detection means.

[Supplementary Note 13]

A recording medium that records a program causing a computer to function as:

an optical signal reception means for receiving an optical signal including sensing information from an optical fiber network that detects the sensing information; and a lightning strike detection means for detecting occurrence of a lightning strike in the optical fiber network by using the sensing information included in the optical signal, wherein the sensing information indicates at least a vibration pattern of the lightning strike, and the lightning strike detection means detects occurrence of the lightning strike, based on the vibration pattern.

[Supplementary Note 14]

The recording medium according to supplementary note 13, wherein the lightning strike detection means detects presence or absence of occurrence of the lightning strike, and also detects an occurrence place of the lightning strike in the optical fiber network.

[Supplementary Note 15]

The recording medium according to supplementary note 13 or 14, wherein the lightning strike detection means detects occurrence of the lightning strike by comparing the vibration pattern with a predetermined reference pattern.

[Supplementary Note 16]

The recording medium according to any one of supplementary notes 13 to 15, wherein the program causes the computer to function as an output control means for performing control in such a way as to output information including a result of detection by the lightning strike detection means.

REFERENCE SIGNS LIST

1 Steel tower
2 Optical fiber cable
3 Optical fiber network
4 Lightning strike detection device
5 Output device
11 Optical signal transmission unit
12 Optical signal reception unit
13 Lightning strike detection unit
14 Output control unit
15 Optical signal transmission/reception unit
21 Computer
31 Transmitter
32 Receiver
33 Processor
34 Memory
35 Processing circuit
100 Lightning strike detection system

What is claimed is:

1. A lightning strike detection device comprising:

at least one memory configured to store instructions; and at least one processor configured to execute the instructions to:

receive an optical signal including sensing information from an optical fiber network configured for communication, the optical fiber network detecting the sensing information; and detect an occurrence of a lightning strike in the optical fiber network by using the sensing information included in the optical signal, wherein the sensing information indicates at least a vibration pattern of the lightning strike, wherein the at least one processor is configured to execute the instructions to:

detect the occurrence of the lightning strike, based on the vibration pattern;

detect presence or absence of the occurrence of the lightning strike; and detect an occurrence place of the lightning strike in the optical fiber network.

2. The lightning strike detection device according to claim 1, wherein the at least one processor is configured to execute the instructions to detect the occurrence of the lightning strike by comparing the vibration pattern with a predetermined reference pattern.

3. The lightning strike detection device according to claim 1, wherein the at least one processor is configured to execute the instructions to output information including a result of detection of the occurrence of the lightning strike.

4. A lightning strike detection system comprising:

at least one memory configured to store instructions; and at least one processor configured to execute the instructions to:

receive an optical signal including sensing information from an optical fiber network configured for communication, the optical fiber network detecting the sensing information and detect an occurrence of a lightning strike in the optical fiber network by using the sensing information included in the optical signal, wherein the sensing information indicates at least a vibration pattern of the lightning strike, wherein the at least one processor is configured to execute the instructions to:

detect the occurrence of the lightning strike, based on the vibration pattern;

detect presence or absence of the occurrence of the lightning strike; and detect an occurrence place of the lightning strike in the optical fiber network.

5. The lightning strike detection system according to claim 4, wherein the at least one processor is configured to execute the instructions to detect the occurrence of the lightning strike by comparing the vibration pattern with a predetermined reference pattern.

6. The lightning strike detection system according to claim 4, wherein the at least one processor is configured to execute the instructions to output information including a result of detection of the occurrence of the lightning strike.

7. A lightning strike detection method comprising:

receiving, by at least one memory configured to store instructions and at least one processor configured to execute the instructions, an optical signal including sensing information from an optical fiber network configured for communication, the optical fiber network detecting the sensing information; and detecting, by the at least one processor, an occurrence of a lightning strike in the optical fiber network by using the sensing information included in the optical signal, wherein the sensing information indicates at least a vibration pattern of the lightning strike, wherein the at least one processor is configured to execute the instructions to:

detect the occurrence of the lightning strike, based on the vibration pattern;

detect presence or absence of the occurrence of the lightning strike; and detect an occurrence place of the lightning strike in the optical fiber network.

8. The lightning strike detection method according to claim 7, further comprising, by the at least one processor, detecting the occurrence of the lightning strike by comparing the vibration pattern with a predetermined reference pattern.

9. The lightning strike detection method according to claim 7, further comprising outputting information including a result of detection by at least one processor.

10. The lightning strike detection device according to claim 2, wherein the at least one processor is configured to execute the instructions to output information including a result of detection of the occurrence of the lightning strike.

11. The lightning strike detection system according to claim 5, wherein the at least one processor outputs information including a result of detection of the occurrence of the lightning strike.

\* \* \* \* \*